United States Patent
Liu

(10) Patent No.: US 10,694,292 B2
(45) Date of Patent: Jun. 23, 2020

(54) ENVIRONMENTAL DETECTION SYSTEM AND SOUND CONTROL METHOD USING THE SAME

(71) Applicant: QUANTA COMPUTER INC., Taoyuan (TW)

(72) Inventor: Chien-Hung Liu, Taoyuan (TW)

(73) Assignee: QUANTA COMPUTER INC. (TW)

( * ) Notice: Subject to any disclaimer, the term of this patent is extended or adjusted under 35 U.S.C. 154(b) by 0 days.

(21) Appl. No.: 16/263,510

(22) Filed: Jan. 31, 2019

(65) Prior Publication Data
US 2020/0169811 A1     May 28, 2020

(30) Foreign Application Priority Data
Nov. 23, 2018   (TW) .............................. 107141884 A

(51) Int. Cl.
| H04R 5/04 | (2006.01) |
| G01S 15/88 | (2006.01) |
| H04R 5/027 | (2006.01) |
| H04R 3/00 | (2006.01) |

(52) U.S. Cl.
CPC ................ *H04R 5/04* (2013.01); *G01S 15/88* (2013.01); *H04R 3/005* (2013.01); *H04R 5/027* (2013.01); *H04R 2420/07* (2013.01)

(58) Field of Classification Search
CPC combination set(s) only.
See application file for complete search history.

(56) References Cited

U.S. PATENT DOCUMENTS

| 5,938,726 A * | 8/1999 | Reber ................... G06Q 10/00 709/217 |
| 8,837,743 B2 * | 9/2014 | Aarts ...................... H04R 3/14 381/17 |
| 2002/0059067 A1 * | 5/2002 | Ono ....................... G10L 15/22 704/240 |
| 2010/0030511 A1 * | 2/2010 | Karl ........................ G01P 3/366 702/143 |
| 2011/0268299 A1 * | 11/2011 | Oda ......................... H04R 5/04 381/307 |
| 2013/0064042 A1 * | 3/2013 | Aarts ..................... G01S 15/89 367/99 |
| 2014/0105417 A1 * | 4/2014 | Cheng ..................... H04R 3/04 381/96 |

(Continued)

FOREIGN PATENT DOCUMENTS

| CN | 2391234 Y | 8/2000 |
| CN | 107172527 A | 9/2017 |

*Primary Examiner* — Duc Nguyen
*Assistant Examiner* — Assad Mohammed
(74) *Attorney, Agent, or Firm* — Innovation Counsel LLP

(57) ABSTRACT

A sound control method includes following steps. Firstly, a controller commands a first ultrasonic transmitter to emit a first ultrasonic wave. Then, in a first time interval, the controller records a first received signal waveform received by an ultrasonic receiver. Then, the controller commands a second ultrasonic transmitter to emit a second ultrasonic wave. Then, in a second time interval, the controller records a second received signal waveform received by the ultrasonic receiver. Then, a playing mode of at least one speaker is controlled according to the first received signal waveform and the second received signal waveform.

9 Claims, 5 Drawing Sheets

(56) References Cited

U.S. PATENT DOCUMENTS

| | | | |
|---|---|---|---|
| 2015/0036462 A1* | 2/2015 | Calvarese | G01S 5/18 367/117 |
| 2015/0078564 A1* | 3/2015 | Guo | G10L 21/02 381/66 |
| 2015/0119067 A1* | 4/2015 | Lavery | H04W 64/003 455/456.1 |
| 2015/0163616 A1* | 6/2015 | Chatterjee | H04R 5/02 381/303 |
| 2015/0215723 A1* | 7/2015 | Carlsson | H04S 7/307 381/307 |
| 2017/0171686 A1* | 6/2017 | Hsieh | G06K 9/00744 |
| 2017/0344336 A1* | 11/2017 | Lotfizadeh | H04R 29/001 |

* cited by examiner

ENVIRONMENTAL DETECTION SYSTEM AND SOUND CONTROL METHOD USING THE SAME

This application claims the benefit of Taiwan application Ser. No. 107141884, filed Nov. 23, 2018, the subject matter of which is incorporated herein by reference.

BACKGROUND OF THE INVENTION

Field of the Invention

The invention relates to an environmental detection system and a sound control method using the same, and more particularly to an environmental detection system using ultrasonic waves and a sound control method using the same.

Description of the Related Art

At present, a home environmental detection system (e.g., a surrounding sound system) has the predetermined speaker volume, and the parameters are set at the imperial position (such as the center of the sofa). However, a person sitting on the sofa may not always sit at the imperial position. When the person sitting on the sofa change the position to approach a certain satellite speaker, it adversely makes the listener feel uncomfortable. Thus, how to provide a new environmental detection system to improve the problem is one of the directions of efforts in the technical field.

SUMMARY OF THE INVENTION

The invention is directed to an environmental detection system and a sound control method using the same capable of improving the conventional problem.

According to an embodiment of the invention, an environmental detection system is provided. The environmental detection system includes a first speaker, a first ultrasonic transmitter, a second speaker, a second ultrasonic transmitter and an ultrasonic receiving device. The first ultrasonic transmitter is disposed on the first speaker, and is used to emit a first ultrasonic wave. The second ultrasonic transmitter is disposed on the second speaker, and is used to emit a second ultrasonic wave. The ultrasonic receiving device includes an ultrasonic receiver and a controller. The ultrasonic receiver is used to receive the first ultrasonic wave and the second ultrasonic wave. The controller is used to: command the first ultrasonic transmitter to emit the first ultrasonic wave; record a first received signal waveform of the ultrasonic receiver in a first time interval; command the second ultrasonic transmitter to emit the second ultrasonic wave; record a second received signal waveform of the ultrasonic receiver in a second time interval; and control a playing mode of at least one of the first speaker and the second speaker according to the first received signal waveform and the second received signal waveform.

According to another embodiment of the invention, a sound control method is provided. The sound control method includes following steps. A controller commands a first ultrasonic transmitter to emit a first ultrasonic wave. The controller records a first received signal waveform received by an ultrasonic receiver in a first time interval. The controller commands a second ultrasonic transmitter to emit a second ultrasonic wave. The controller records a second received signal waveform received by the ultrasonic receiver in a second time interval. The controller controls a playing mode of at least one speaker according to the first received signal waveform and the second received signal waveform.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
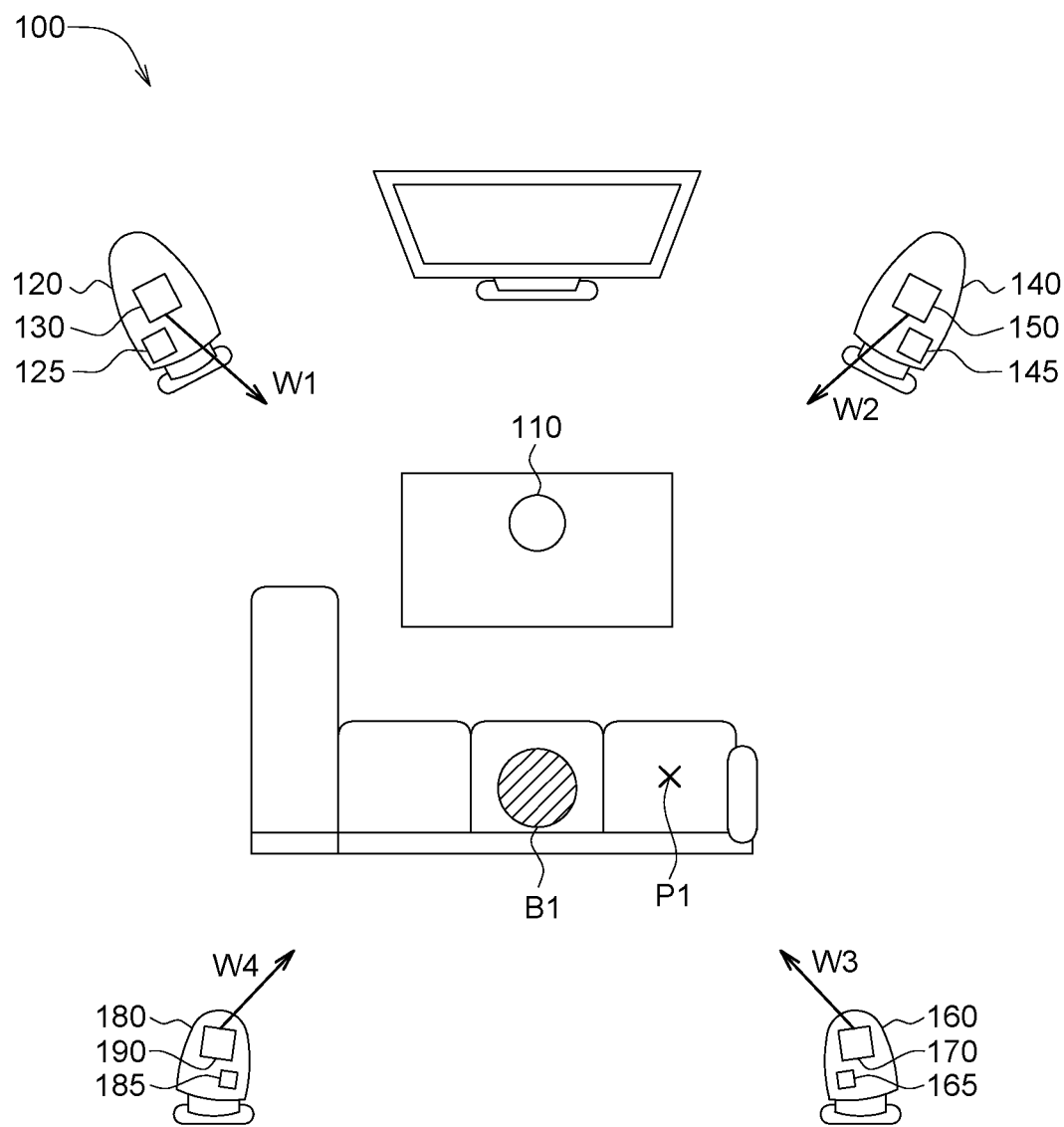
FIG. 1 is a schematic view showing an environmental detection system according to an embodiment of the invention.
Figure 2A:
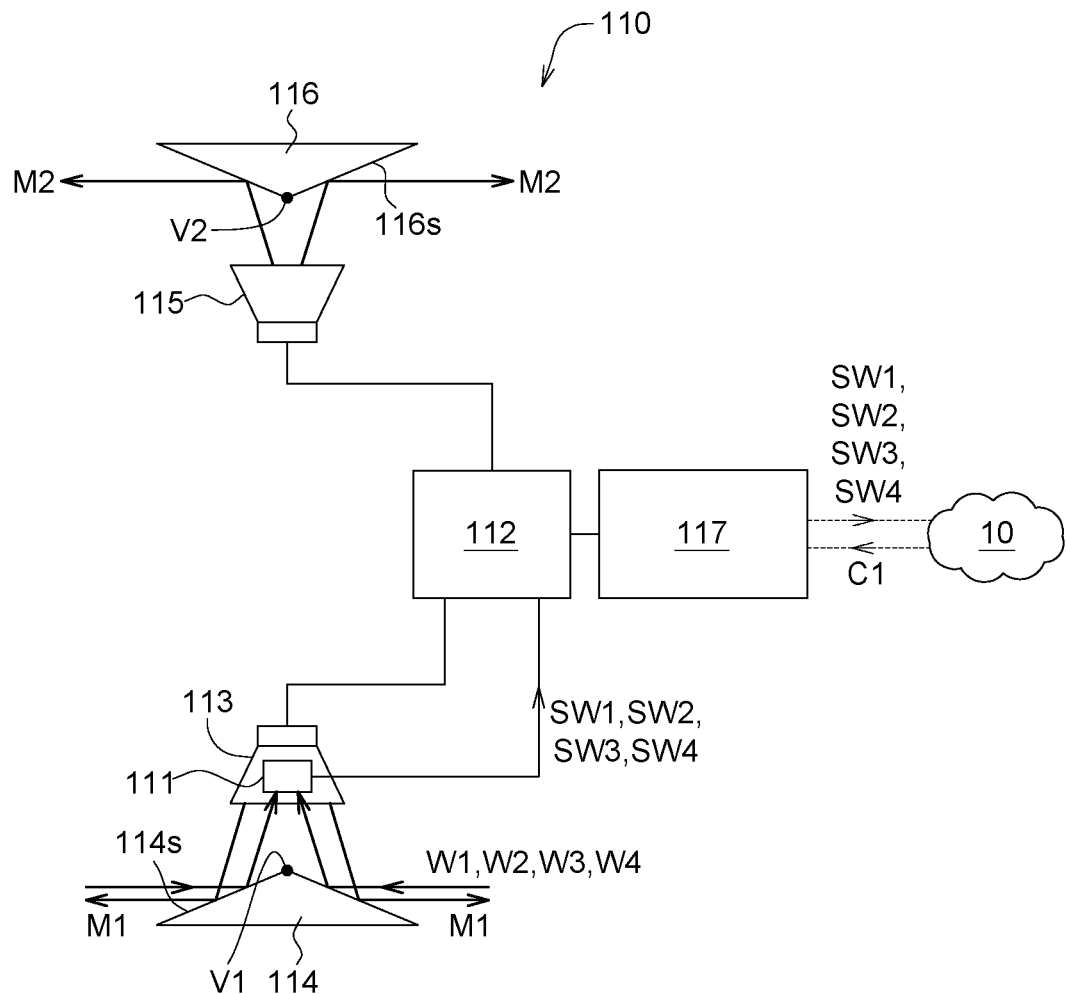
FIG. 2A is a schematic view showing an ultrasonic receiving device of FIG. 1.
Figure 2B:
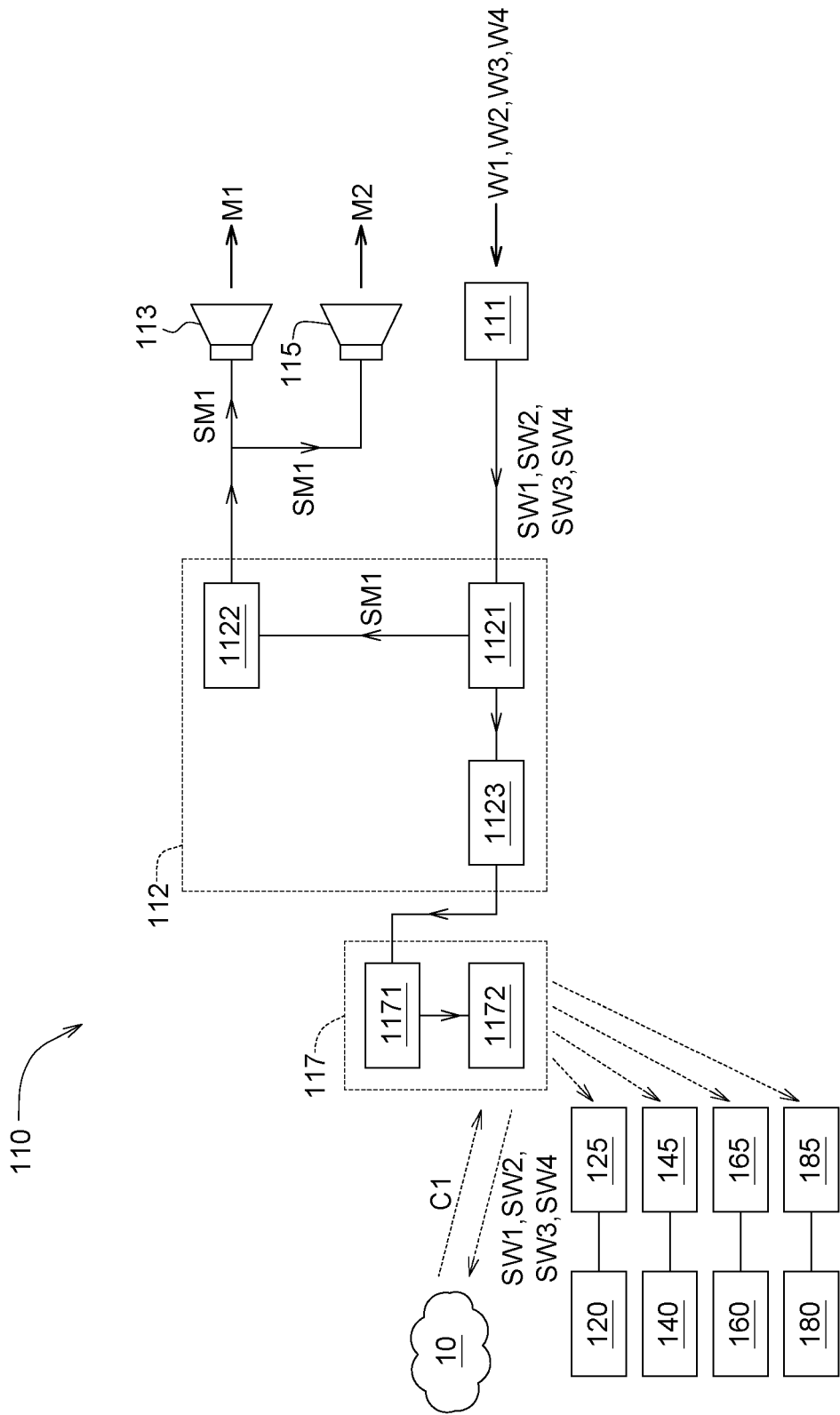
FIG. 2B is a functional block diagram showing the ultrasonic receiving device of FIG. 2A.
Figure 3:
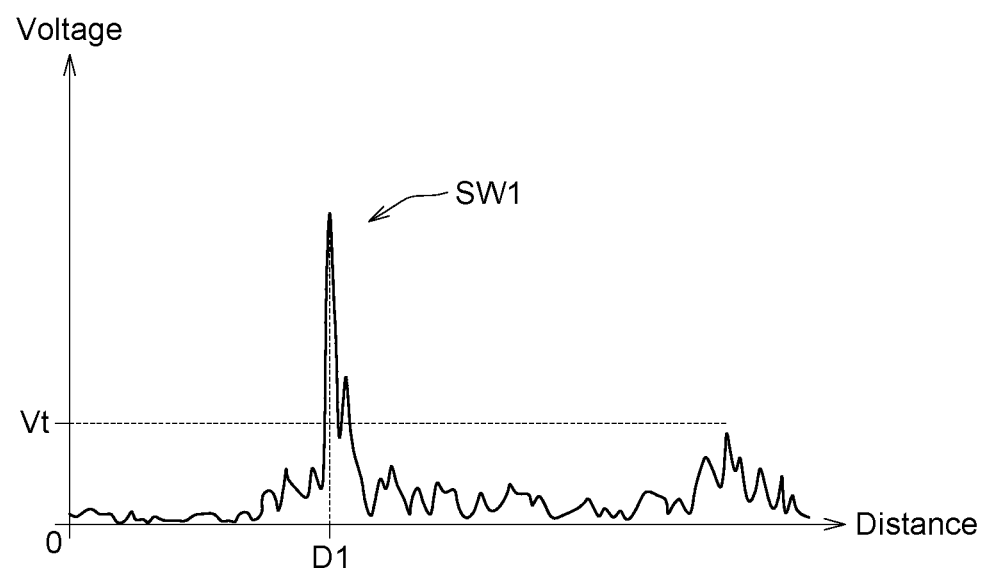
FIG. 3 is a schematic view showing a first received signal waveform of FIG. 1.

Please refer to FIG.S 1 to 3. FIG. 1 is a schematic view showing an environmental detection system 100 according to an embodiment of the invention. FIG. 2A is a schematic view showing an ultrasonic receiving device 110 of FIG. 1. FIG. 2B is a functional block diagram showing the ultrasonic receiving device 110 of FIG. 2A. FIG. 3 is a schematic view showing a first received signal waveform SW1 of FIG. 1.

The environmental detection system 100 can configure an environment to detect a change in the environment, such as a state of at least one reflector B1 in the environment, such as a static position or a dynamic change thereof. In this specification, the term "environment" refer to the space in the building, for example, wherein the building is, for example, one of various buildings, such as an office building, a family residence, a restaurant and the like. The reflector B1 is an object capable of reflecting an ultrasonic wave in the environment, such as a living body (e.g., human, animal) or a non-living body (e.g., wall, furniture, home appliance and the like).

As shown in FIG. 1, the environmental detection system 100 includes the ultrasonic receiving device 110, a first speaker 120, a first communicator 125, a first ultrasonic transmitter 130, a second speaker 140, a second communicator 145, a second ultrasonic transmitter 150, a third speaker 160, a third communicator 165, a third ultrasonic transmitter 170, a fourth speaker 180, a fourth communicator 185 and a fourth ultrasonic transmitter 190.

As shown in FIG. 1, the first ultrasonic transmitter 130 is disposed on the first speaker 120 and is used to emit a first ultrasonic wave W1. The second ultrasonic transmitter 150 is disposed on the second speaker 140 and is used to emit a second ultrasonic wave W2. The third ultrasonic transmitter 170 is disposed on the third speaker 160 and is used to emit a third ultrasonic wave W3. The fourth ultrasonic transmitter 190 is disposed on the fourth speaker 180 and is used to emit a fourth ultrasonic wave W4.

Referring to FIGS. 2A and 2B, the ultrasonic receiving device 110 includes an ultrasonic receiver 111, a circuit board 112, a fifth speaker 113, a first reflective device 114, a sixth speaker 115, a second reflective device 116 and a control module 117. The circuit board 112 includes a controller 1121, an amplifier 1122 and a communication module 1123. In addition, the controller 1121, the amplifier 1122 and the communication module 1123 may be circuits formed using the semiconductor technology. In an embodiment, at least two of the controller 1121, the amplifier 1122 and the communication module 1123 may be integrated into a single circuit. The control module 117 includes a processor 1171 and a communication element 1172. The processor 1171 and the communication element 1172 may be circuits formed using the semiconductor technology. In an embodiment, the processor 1171 and the communication element 1172 may be integrated into a single circuit.

As shown in FIG. 2B, the ultrasonic receiver 111 is used to receive the first ultrasonic wave W1, the second ultrasonic wave W2, the third ultrasonic wave W3 and the fourth ultrasonic wave W4. The controller 1121 is used to: (a) command the first ultrasonic transmitter 130 to emit the first ultrasonic wave W1; (b) record a first received signal waveform SW1 of the ultrasonic receiver 111 in a first time interval; (c) command the second ultrasonic transmitter 150 to emit the second ultrasonic wave W2; (d) record a second received signal waveform SW2 of the ultrasonic receiver 111 in a second time interval; (e) command the third ultrasonic transmitter 170 to emit the third ultrasonic wave W3; (f) record a third received signal waveform SW3 of the ultrasonic receiver 111 in a third time interval; (g) command the fourth ultrasonic transmitter 190 to emit the fourth ultrasonic wave W4; (h) record a fourth received signal waveform SW4 of the ultrasonic receiver 111 in a fourth time interval; and (i) control a playing mode of at least one of the first speaker 120, the second speaker 140, the third speaker 160 and the fourth speaker 180 according to the first received signal waveform SW1, the second received signal waveform SW2, the third received signal waveform SW3 and the fourth received signal waveform SW4.

In summary, it is obtained that the environmental detection system 100 of the embodiment of the invention may change the playing mode of at least one speaker according to the current situation of the environment or environmental change.

In this embodiment, the ultrasonic receiver 111 may control the ultrasonic transmitters to output the ultrasonic waves in different time intervals. For example, in the first time interval, the controller 1121 only controls the first ultrasonic transmitter 130 in the ultrasonic transmitters to output the first ultrasonic wave W1, while other ultrasonic transmitters do not emit the ultrasonic waves. Thus, when the ultrasonic receiver 111 receives the reflected ultrasonic wave in the first time interval, it can be determined that the reflected ultrasonic wave received is outputted by the first ultrasonic transmitter 130.

Similarly, in the second time interval, the controller 1121 only controls the second ultrasonic transmitter 150 in the ultrasonic transmitters to output the second ultrasonic wave W2, while other ultrasonic transmitters do not emit the ultrasonic waves. Thus, when the ultrasonic receiver 111 receives the reflected ultrasonic wave in the second time interval, it can be determined that the reflected ultrasonic wave received is outputted by the second ultrasonic transmitter 150. Similarly, in a third time interval, the controller 1121 only controls the third ultrasonic transmitter 170 in the ultrasonic transmitters to output the third ultrasonic wave W3, while other ultrasonic transmitters do not emit the ultrasonic waves. Thus, when the ultrasonic receiver 111 receives the reflected ultrasonic wave in the third time interval, it can be determined that the reflected ultrasonic wave received is outputted by the third ultrasonic transmitter 170. Similarly, in the fourth time interval, the controller 1121 only controls the fourth ultrasonic transmitter 190 in the ultrasonic transmitters to output the fourth ultrasonic wave W4, while other ultrasonic transmitters do not emit the ultrasonic waves. Thus, when the ultrasonic receiver 111 receives the reflected ultrasonic wave in the fourth time interval, it can be determined that the reflected ultrasonic wave received is outputted by the fourth ultrasonic transmitter 190.

In an embodiment, as shown in FIG. 2B, the controller 1121 commands the ultrasonic transmitter to output the ultrasonic wave through the control module 117, for example. In an embodiment, the control module 117 may also be integrated into the circuit board 112 or the controller 1121.

As shown in FIG. 1, the first ultrasonic transmitter 130, the second ultrasonic transmitter 150, the third ultrasonic transmitter 170 and the fourth ultrasonic transmitter 190 constitute four vertices of a tetragon, and the ultrasonic receiving device 110 is located within the range of the tetragon to ensure that the ultrasonic receiving device 110 can receive the ultrasonic waves of all ultrasonic transmitters. In an embodiment, the ultrasonic receiving device 110 is approximately located at the center position of the tetragon.

As shown in FIG. 3, the first received signal waveform SW1 is a waveform converted after the ultrasonic receiving device 110 receives the first ultrasonic wave W1. The horizontal axis in the figure represents a distance, and the vertical axis represents the voltage change. As shown in the figure, when the voltage of the first received signal waveform SW1 exceeds a threshold voltage value Vt (a surge as shown in figure), it represents that the ultrasonic receiving device 110 has received the first ultrasonic wave W1 outputted by the first ultrasonic transmitter 130, and thus represents that the reflector B1 is not disposed between the first speaker 120 and the ultrasonic receiving device 110 to block the first speaker 120 from the ultrasonic receiving device 110. That is, the reflector B1 is not located at a connection path between the ultrasonic receiving device 110 and the first speaker 120. On the contrary, when the voltage value of the first received signal waveform SW1 as shown in FIG. 3 is lower than the threshold voltage value Vt (i.e., FIG. 3 does not have the surge shown), it represents that the reflector B1 is located at the connection path between the ultrasonic receiving device 110 and the first speaker 120, so that the ultrasonic receiving device 110 cannot receive the first ultrasonic wave W1 (the reflector B1 blocks the ultrasonic wave, so that the ultrasonic wave can not be transmitted to the ultrasonic receiving device 110). The second received signal waveform SW2, the third received signal waveform SW3 and the fourth received signal waveform SW4 have characteristics similar to those of the first received signal waveform SW1, and it is no longer depicted and described here.

In summary, the environment information, such as the approximate position of the reflector B1, may be obtained by analyzing the first received signal waveform SW1, the second received signal waveform SW2, the third received signal waveform SW3 and the fourth received signal waveform SW4. The controller 1121 may control the playing mode of at least one of the first speaker 120, the second speaker 140, the third speaker 160 and the fourth speaker 180 according to the approximate position of the reflector B1. "Control the playing mode" used in this specification may represent changing the playing mode or retaining the playing mode. For changing of the playing mode, when the voltage of the third received signal waveform SW3 exceeds the threshold voltage value Vt (if there is a surge similar to that shown in FIG. 3), it represents that when the reflector B1 is located at the position P1 of FIG. 1, the controller 1121 may control the third speaker 160 and the second speaker 140 to increase the volume, and control the first speaker 120 and the fourth speaker 180 to increase the volume accordingly. However, this is not used to limit the embodiment of the invention. For retaining of the playing mode, when the signal waveform received does not change, the controller 1121 may retain the current control mode.

In an embodiment, the control method of the controller 1121 on the speaker may be performed according to a control signal C1 from a cloud server 10. For example, as shown in FIGS. 2A and 2B, the controller 1121 is further used to transmit the first received signal waveform SW1, the second received signal waveform SW2, the third received signal waveform SW3 and the fourth received signal waveform SW4 to the cloud server 10. The cloud server 10 analyzes the first received signal waveform SW1, the second received signal waveform SW2, the third received signal waveform SW3 and the fourth received signal waveform SW4 to obtain the approximate position of the reflector B1. Then, the cloud server 10 outputs the corresponding control signal C1 according to the approximate position of the reflector B1. The controller 1121 is further used to respond to the outputted control signal C1 according to cloud server 10, and control the playing mode of at least one of the first speaker 120, the second speaker 140, the third speaker 160 and the fourth speaker 180.

In another embodiment, the processor 1171 or the controller 1121 may control the function of at least one electronic device (not shown) according to the control signal C1. The electronic device is, for example, an electrical element built in the ultrasonic receiving device 110 or an electrical element located outside the ultrasonic receiving device 110. The electronic device is, for example a light source (such as an atmosphere lamp, a night lamp), a home appliance (such as an air purifier), Internet of things (IoT) devices or the like.

In another embodiment, steps and/or functions of the cloud server 10 may also be performed by the processor 1171 and/or the circuit board 112.

As shown in FIG. 1, the first communicator 125 is disposed on the first speaker 120, and the first communicator 125 is electrically connected to the first ultrasonic transmitter 130 and the first speaker 120. The communication element 1172 of the ultrasonic receiving device 110 may be paired with the first communicator 125 using the bluetooth communication technology for wireless pairing, for example. After pairing, the ultrasonic receiving device 110 may control the first ultrasonic transmitter 130 and the first speaker 120 through the first communicator 125.

Similarly, the second communicator 145 is disposed on the second speaker 140, and the second communicator 145 is electrically connected to the second ultrasonic transmitter 150 and the second speaker 140. The communication element 1172 of the ultrasonic receiving device 110 may be paired with the second communicator 145. After pairing, the ultrasonic receiving device 110 may control the first ultrasonic transmitter 130 and the first speaker 120 through the first communicator 125.

Similarly, the third communicator 165 is disposed on the third speaker 160, and the third communicator 165 is electrically connected to the third ultrasonic transmitter 170 and the third speaker 160. The communication element 1172 of the ultrasonic receiving device 110 may be paired with the third communicator 165. After pairing, the ultrasonic receiving device 110 may control the third ultrasonic transmitter 170 and the third speaker 160 through the third communicator 165.

Similarly, the fourth communicator 185 is disposed on the fourth speaker 180, and the fourth communicator 185 is electrically connected to the fourth ultrasonic transmitter 190 and the fourth speaker 180. The communication element 1172 of the ultrasonic receiving device 110 is paired with the fourth communicator 185. After pairing, the ultrasonic receiving device 110 may control the fourth ultrasonic transmitter 190 and the fourth speaker 180 through the fourth communicator 185.

In addition, the first communicator 125, the second communicator 145, the third communicator 165 and the fourth communicator 185 are wireless communicators, such as a WiFi communication module or a bluetooth communication module, for example.

As shown in FIGS. 2A and 2B, in the ultrasonic receiving device 110, the fifth speaker 113 is electrically connected to the circuit board 112, and is used to play the first music M1. In addition, the ultrasonic receiver 111 and the fifth speaker 113 may be integrated into a single component. For example, one of the speakers in a child-mother speaker may be replaced with the ultrasonic receiver 111, and another speaker in the child-mother speaker is the fifth speaker 113. However, the embodiment of the invention is not limited thereto.

As shown in FIG. 2A, the first reflective device 114 has a first reflective tapered surface 114s, which faces the ultrasonic receiver 111 and is used to fully circumferentially reflect the first music M1 to the environment and fully circumferentially reflect the first ultrasonic wave W1, the second ultrasonic wave W2, the third ultrasonic wave W3 and the fourth ultrasonic wave W4 to the ultrasonic receiver 111. The "fully circumferentially" used in this specification means that the ultrasonic system propagates 360 degrees (viewed in the direction of the top view of FIG. 2A) outward (to the environment), or is referred to as the surrounding ultrasonic wave. In addition, the first reflective device 114 is made of plastic, for example.

As shown in FIG. 2A in this embodiment, a cone point V1 of the first reflective tapered surface 114s may be aligned with the central area of the fifth speaker 113 to make most or almost all of the ultrasonic waves reflected from the first reflective tapered surface 114s propagate to the central area of the fifth speaker 113. In addition, the ultrasonic receiver 111 may be disposed in the central area of the fifth speaker 113 to receive the ultrasonic wave having the stronger or the strongest signal intensity. In addition, in this embodiment, because the cone point V1 of the first reflective tapered surface 114s is aligned with the central area of the fifth speaker 113, the first music M1 outputted from the fifth speaker 113 can propagate to surround the tapered surface of the cone point V1 and can be fully circumferentially reflected to the environment. In other words, the first reflective device 114 can make the first music M1 become the surrounding sound.

In addition, as mentioned above, in this embodiment, the first ultrasonic wave W1, the second ultrasonic wave W2, the third ultrasonic wave W3 and the fourth ultrasonic wave W4 are reflected to the ultrasonic receiver 111 at different times.

As shown in FIGS. 2A and 2B, in the ultrasonic receiving device 110, the sixth speaker 115 is electrically connected to the circuit board 112 and is used to play the second music M2. The second reflective device 116 has a second reflective tapered surface 116s, which faces the sixth speaker 115 and is used to fully circumferentially reflect the second music M2 to the environment. In other words, the second reflective device 116 can make the second music M2 become the surrounding sound. As shown in this figure, in this embodiment, a cone point V2 of the second reflective tapered surface 116s may be aligned with the central area of the sixth speaker 115 to make most or almost all of the ultrasonic wave reflected from the second reflective tapered surface 116s propagate to the central area of the fifth speaker 113. In addition, the ultrasonic receiver 111 may be disposed in the central area of the fifth speaker 113 to receive the ultrasonic wave having the stronger or the strongest signal intensity. In this embodiment, the cone point V2 of the second reflective tapered surface 116s is aligned with the center position of the sixth speaker 115, and the second music M2 outputted from the sixth speaker 115 can propagate to surround the tapered surface of the cone point V2 and can be fully circumferentially reflected to the environment. In addition, the second reflective device 116 is made of plastic, for example.

In an embodiment, for example, the music signal SM1 of the first music M1 and the second music M2 comes from external devices, such as the cloud server 10, but may also come from external devices, such as the cloud server 10 or other devices located outside the ultrasonic receiving device 110, such as a flash drive, a mobile phone, a computer and the like, and may also come from the circuit board 112. In addition, the external device may utilize the wireless communication technology (such as a WiFi technology or a bluetooth technology) or wired communication technology to transmit the music signal SM1 to the control module 117, and then to the circuit board 112 through the control module 117.

In an embodiment, the fifth speaker 113 and the sixth speaker 115 may output the music with different audio. For example, the fifth speaker 113 may output a medium-high frequency (medium-high pitch) sound in the music signal SM1 (such as the audio ranging from 20 Hz to 20KHz), and the sixth speaker 115 may output a low frequency (bass) sound in the music signal SM1. In another embodiment, the fifth speaker 113 may output a low frequency (bass) sound in the music signal SM1, and the sixth speaker 115 may output a medium-high frequency (medium-high pitch) sound in the music signal SM1.

In another embodiment, if there is no requirement for playing the music, then the fifth speaker 113, the sixth speaker 115 and the amplifier 1122 may be selectively omitted in the ultrasonic receiving device 110.

In addition, although the environmental detection system 100 of the embodiment includes four sets of ultrasonic transmitting devices (e.g., a set of ultrasonic transmitting devices is a combination of a speaker, an ultrasonic transmitter and a communicator), this does not intend to limit the embodiment of the invention. In another embodiment, two sets of ultrasonic transmitting devices may be omitted from the environmental detection system 100. For example, the ultrasonic transmitting device composed of the third speaker 160, the third communicator 165 and the third ultrasonic transmitter 170 may be omitted and the ultrasonic transmitting device composed of the fourth speaker 180, the fourth communicator 185 and the fourth ultrasonic transmitter 190 may be omitted. In other embodiments, the environmental detection system 100 may include five or more sets of ultrasonic transmitting devices.

Figure 4:
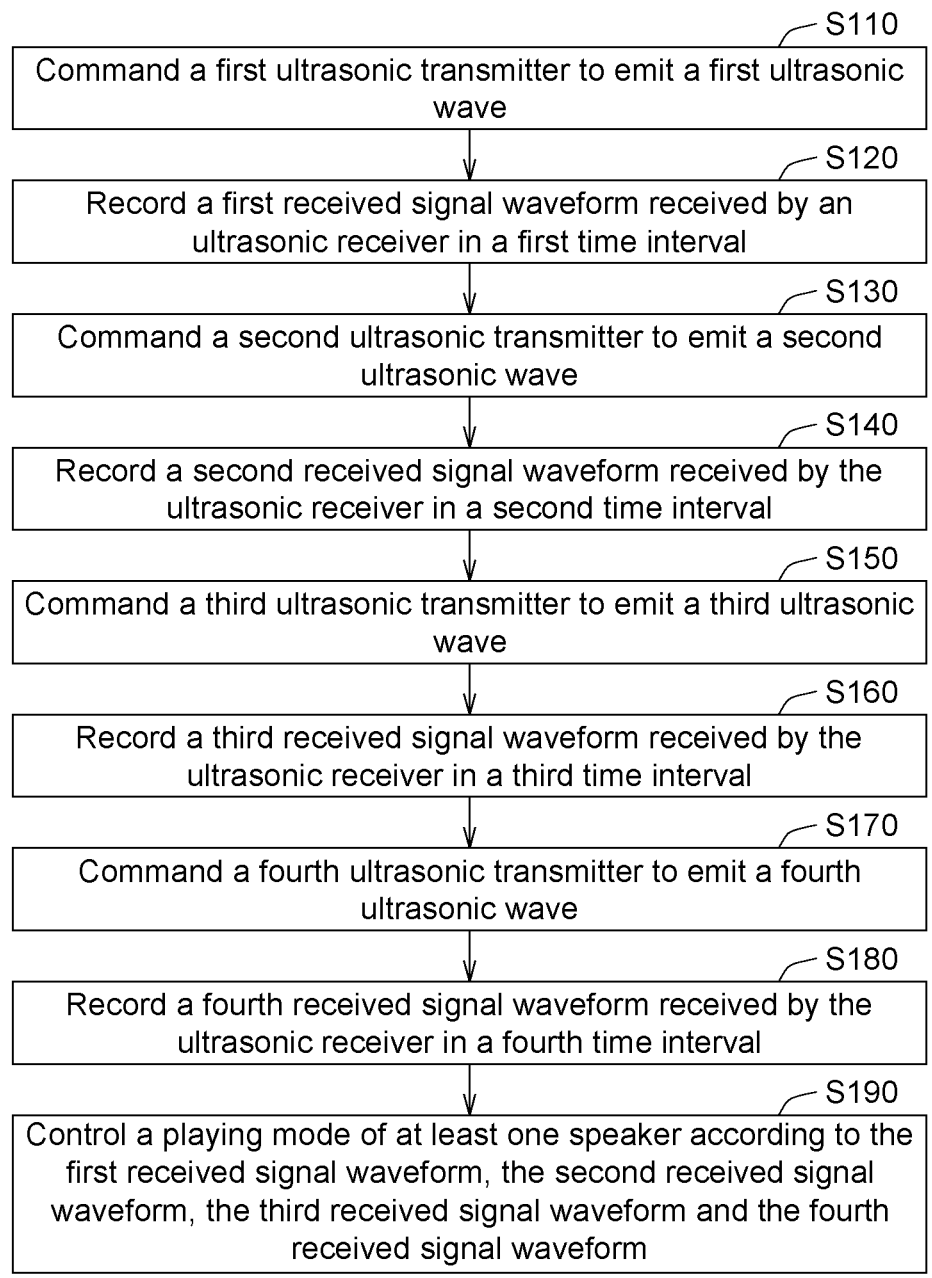
FIG. 4 is a flow chart showing a sound control method of an environmental detection system of FIG. 2A.

Please refer to FIG. 4. FIG. 4 is a flow chart showing a sound control method of the environmental detection system of FIG. 2A.

In a step S110, as shown in FIGS. 2A and 2B, the controller 1121 commands the first ultrasonic transmitter 130 to output the first ultrasonic wave W1.

In a step S120, as shown in FIGS. 2A and 2B, the controller 1121 records the first received signal waveform SW1 received by the ultrasonic receiver 111 in the first time interval.

In a step S130, as shown in FIGS. 2A and 2B, the controller 1121 commands the second ultrasonic transmitter 150 to output the second ultrasonic wave W2.

In a step S140, as shown in FIGS. 2A and 2B, the controller 1121 records the second received signal waveform SW2 received by the ultrasonic receiver 111 in the second time interval.

In a step S150, as shown in FIGS. 2A and 2B, the controller 1121 commands the third ultrasonic transmitter 170 to output the third ultrasonic wave W3.

In a step S160, as shown in FIGS. 2A and 2B, the controller 1121 records the third received signal waveform SW3 received by the ultrasonic receiver 111 in the third time interval.

In a step S170, as shown in FIGS. 2A and 2B, the controller 1121 commands the fourth ultrasonic transmitter 190 to output the fourth ultrasonic wave W4.

In a step S180, as shown in FIGS. 2A and 2B, the controller 1121 records the fourth received signal waveform SW4 received by the ultrasonic receiver 111 in the fourth time interval.

The first time interval, the second time interval, the third time interval and the fourth time interval are non-overlapped time intervals, and this prevents the first ultrasonic wave W1, the second ultrasonic wave W2, the third ultrasonic wave W3 and the fourth ultrasonic wave W4 from interfering with each other in the same time interval.

In a step S190, the controller 1121 controls a playing mode of at least one of the first speaker 120, the second speaker 140, the third speaker 160 and the fourth speaker 180 according to the first received signal waveform SW1, the second received signal waveform SW2, the third received signal waveform SW3 and the fourth received signal waveform SW4.

In this embodiment, the controller 1121 may transmit the first received signal waveform SW1, the second received signal waveform SW2, the third received signal waveform SW3 and the fourth received signal waveform SW4 to the cloud server 10 through the control module 117 for analysis. The cloud server 10 outputs the corresponding control signal C1 according to the analysis result. Then, the controller 1121 performs the corresponding control according to the control signal C1. In another embodiment, the controller 1121 itself has the function of the cloud server 10, and can perform the action of the cloud server 10.

Then, the process may return to the step S110 to continuously detect the environmental change, and then continuously and correspondingly control the functions of the speaker and/or other electronic devices.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An environmental detection system, comprising:
a first speaker;
a first ultrasonic transmitter, which is disposed on the first speaker and emits a first ultrasonic wave;
a second speaker;
a second ultrasonic transmitter, which is disposed on the second speaker and emits a second ultrasonic wave; and
an ultrasonic receiving device, comprising:
an ultrasonic receiver fully circumferentially receiving the first ultrasonic wave and the second ultrasonic wave; and
a controller, which:
commands the first ultrasonic transmitter to emit the first ultrasonic wave;
records a first received signal waveform of the ultrasonic receiver in a first time interval;
commands the second ultrasonic transmitter to emit the second ultrasonic wave;
records a second received signal waveform of the ultrasonic receiver in a second time interval; and
controls a playing mode of at least one of the first speaker and the second speaker according to the first received signal waveform and the second received signal waveform;
wherein the ultrasonic receiving device further comprises:
a fifth speaker, which is electrically connected to the controller, and plays first music, wherein the ultrasonic receiver is integrated in the fifth speaker; and
a first reflective device having a first reflective tapered surface, which faces the ultrasonic receiver and fully circumferentially reflects the first music to an environment and reflects the first ultrasonic wave and the second ultrasonic wave to the ultrasonic receiver.

2. The environmental detection system according to claim 1, wherein the first time interval and the second time interval are non-overlapped time intervals.

3. The environmental detection system according to claim 1, further comprising:
a third speaker;
a third ultrasonic transmitter, which is disposed on the third speaker and emits a third ultrasonic wave;
a fourth speaker; and
a fourth ultrasonic transmitter, which is disposed on the fourth speaker and emits a fourth ultrasonic wave;
wherein the ultrasonic receiver further fully circumferentially receives the third ultrasonic wave and the fourth ultrasonic wave; and the controller further:
commands the third ultrasonic transmitter to emit the third ultrasonic wave;
records a third received signal waveform of the ultrasonic receiver in a third time interval;
commands the fourth ultrasonic transmitter to emit the fourth ultrasonic wave;
records a fourth received signal waveform of the ultrasonic receiver in a fourth time interval; and
controls a playing mode of at least one of the first speaker, the second speaker, the third speaker and the fourth speaker according to the first received signal waveform and the second received signal waveform.

4. The environmental detection system according to claim 3, wherein the first ultrasonic transmitter, the second ultrasonic transmitter, the third ultrasonic transmitter and the fourth ultrasonic transmitter constitute four vertices of a tetragon, and the ultrasonic receiving device is disposed within a range of the tetragon.

5. The environmental detection system according to claim 3, wherein the playing mode of at least one of the first speaker, the second speaker, the third speaker and the fourth speaker is controlled by:
the controller transmitting the first received signal waveform and the second received signal waveform to a cloud server; and
the controller controlling the playing mode of at least one of the first speaker and the second speaker according to a control signal of the cloud server in response to the first received signal waveform and the second received signal waveform.

6. The environmental detection system according to claim 1, further comprising:
a first communicator disposed on the first speaker; and
a second communicator disposed on the second speaker;
wherein the ultrasonic receiving device comprises a communication element, which performs wireless pairing with the first communicator and the second communicator.

7. The environmental detection system according to claim 1, wherein the ultrasonic receiving device further comprises:
a sixth speaker, which is electrically connected to the controller and plays second music; and
a second reflective device having a second reflective tapered surface, which faces the sixth speaker and fully circumferentially reflects the second music to an environment.

8. A sound control method, comprising:
commanding, by a controller of an ultrasonic receiving device, a first ultrasonic transmitter to emit a first ultrasonic wave;
recording, by the controller, a first received signal waveform received by an ultrasonic receiver in a first time interval;
commanding, by the controller, a second ultrasonic transmitter to emit a second ultrasonic wave;
recording, by the controller, a second received signal waveform received by the ultrasonic receiver in a second time interval; and
controlling a playing mode of at least one speaker according to the first received signal waveform and the second received signal waveform;
wherein the ultrasonic receiving device further comprises:
a fifth speaker, which is electrically connected to the controller, and plays first music, wherein the ultrasonic receiver is integrated in the fifth speaker; and
a first reflective device having a first reflective tapered surface, which faces the ultrasonic receiver and fully circumferentially reflects the first music to an environment and reflects the first ultrasonic wave and the second ultrasonic wave to the ultrasonic receiver.

9. The sound control method according to claim 8, wherein the first time interval and the second time interval are non-overlapped time intervals.

* * * * *